US010318009B2

(12) United States Patent
Aoyama et al.

(10) Patent No.: US 10,318,009 B2
(45) Date of Patent: Jun. 11, 2019

(54) METHOD, NON-TRANSITORY COMPUTER-READABLE MEDIUM, AND DEVICE FOR CONTROLLING A USER-INTERFACE

(71) Applicant: HI CORPORATION, Shinjuku-ku, Tokyo (JP)

(72) Inventors: Tomonobu Aoyama, Tokyo (JP); Tatsuo Sasaki, Tokyo (JP); Seiichi Kataoka, Tokyo (JP)

(73) Assignee: HI CORPORATION, Tokyo (JP)

( * ) Notice: Subject to any disclaimer, the term of this patent is extended or adjusted under 35 U.S.C. 154(b) by 0 days.

(21) Appl. No.: 15/486,738

(22) Filed: Apr. 13, 2017

(65) Prior Publication Data

US 2018/0101236 A1 Apr. 12, 2018

(30) Foreign Application Priority Data

Oct. 12, 2016 (JP) .................................. 2016-201171

(51) Int. Cl.
*G06F 3/01* (2006.01)

(52) U.S. Cl.
CPC .................................... *G06F 3/017* (2013.01)

(58) Field of Classification Search
CPC combination set(s) only.
See application file for complete search history.

(56) References Cited

U.S. PATENT DOCUMENTS

| 6,484,164 B1 | 11/2002 | Nikolovska et al. |
| 6,751,594 B1 | 6/2004 | Diehl et al. |
| 2006/0074653 A1* | 4/2006 | Mitari ................ G06K 9/00248 704/240 |

(Continued)

FOREIGN PATENT DOCUMENTS

| JP | 2000-231398 A | 8/2000 |
| JP | 2003-529154 A | 9/2003 |

(Continued)

OTHER PUBLICATIONS

International Search Report dated Nov. 14, 2017; PCT/JP2017/036692 English translation not currently available.

(Continued)

*Primary Examiner* — Jennifer Mehmood
*Assistant Examiner* — Deeprose Subedi
(74) *Attorney, Agent, or Firm* — Ladas & Parry LLP

(57) ABSTRACT

For the purpose of enhancing accessibility of a user with respect to various applications, the disclosed technique provides a method for controlling a user-interface that provides an instruction to an application through a user-operation which is performed on a display provided on a device. The method includes a process performed by the device. The process includes: acquiring information displayed by the display; extracting at least one feature existing on the acquired information; receiving an action of a user; searching a database to identify a predetermined operation, which corresponds to the received action and the extracted at least one feature; and providing an instruction to the application through applying the identified predetermined operation, not the received action, to the user-interface.

8 Claims, 10 Drawing Sheets

(56) References Cited

U.S. PATENT DOCUMENTS

2011/0301934 A1* 12/2011 Tardif ................... G06F 3/017
704/1
2011/0317874 A1   12/2011 Ikenoue
2016/0034039 A1    2/2016 Maeda et al.

FOREIGN PATENT DOCUMENTS

JP     2010-191826 A     9/2010
JP     2014-186361 A    10/2014

OTHER PUBLICATIONS

Hiroshi Ota, Microsoft: "Introduction of new technologies Windows 7 Sensor & Location-Blunt Forms", Instrumentation Control Engineering, vol. 54, No. 1, Jan. 2014; 16 pp.
Japanese Office Action dated Mar. 19, 2019; Appln. No. 2017-171808.

* cited by examiner

FIG.3

| | ACTION OF USER (GESTURE) | ACTION OF USER (VOICE) | INSTRUCTION | FEATURE OF DISPLAY OF APPLICATION X: TEXTS "CURRENT PLACE" AND "DESTINATION" EXIST AT DISPLAY-POSITIONS (X1, Y1) AND (X2, Y2), RESPECTIVELY | FEATURE OF DISPLAY OF APPLICATION Y: TEXTS "DEPARTURE PLACE", "CURRENT PLACE" AND "DESTINATION" EXIST AT THE BOTTOM OF DISPLAY FROM THE LEFT TO THE RIGHT | FEATURE OF DISPLAY OF APPLICATION Z: SYMBOL A AND SYMBOL B EXIST AT DISPLAY-POSITIONS (X3, Y3) AND (X4, Y4), RESPECTIVELY  SYMBOL A (INSTRUCTION FOR DISPLAYING A DESTINATION) ▽  SYMBOL B (INSTRUCTION FOR DISPLAYING A CURRENT PLACE) ◎ |
|---|---|---|---|---|---|---|
| 320 | | | | | | |
| 330 | ☝ | DEPARTURE PLACE | INSTRUCTION FOR DISPLAYING A DEPARTURE PLACE AT THE SCREEN CENTER | | PROVIDING AN OPERATION OF TAPPING ON "DEPARTURE PLACE" TO THE APPLICATION Y | |
| 340 | 👇 | CURRENT PLACE | INSTRUCTION FOR DISPLAYING A CURRENT PLACE AT THE SCREEN CENTER | PROVIDING AN OPERATION OF TAPPING ON "CURRENT PLACE" TO THE APPLICATION X | PROVIDING AN OPERATION OF TAPPING ON "CURRENT PLACE" TO THE APPLICATION Y | PROVIDING AN OPERATION OF TAPPING ON SYMBOL B TO THE APPLICATION Z |
| 350 | 👍 | DESTINATION | INSTRUCTION FOR DISPLAYING A DESTINATION AT THE SCREEN CENTER | PROVIDING AN OPERATION OF TAPPING ON "DESTINATION" TO THE APPLICATION X | PROVIDING AN OPERATION OF TAPPING ON "DESTINATION" TO THE APPLICATION Y | PROVIDING AN OPERATION OF TAPPING ON SYMBOL A TO THE APPLICATION Z |
| 360 | ✋ | ZOOM IN | INSTRUCTION FOR ZOOMING IN | PROVIDING AN OPERATION OF PINCHING OUT BY 2 cm TO THE APPLICATION X | PROVIDING AN OPERATION OF DOUBLE-TAPPING AND THEN DIRECTLY SWIPING DOWN BY 2 cm TO THE APPLICATION Y | PROVIDING AN OPERATION OF PINCHING OUT BY 2 cm TO THE APPLICATION Z |
| 370 | ✊ | ZOOM OUT | INSTRUCTION FOR ZOOMING OUT | PROVIDING AN OPERATION OF PINCHING IN BY 2 cm TO THE APPLICATION X | PROVIDING AN OPERATION OF DOUBLE-TAPPING AND THEN DIRECTLY SWIPING UP BY 2 cm TO THE APPLICATION Y | PROVIDING AN OPERATION OF PINCHING IN BY 2 cm TO THE APPLICATION Z |
| | | ... | ... | ... | ... | ... |
| | | | ... | ... | ... | ... |

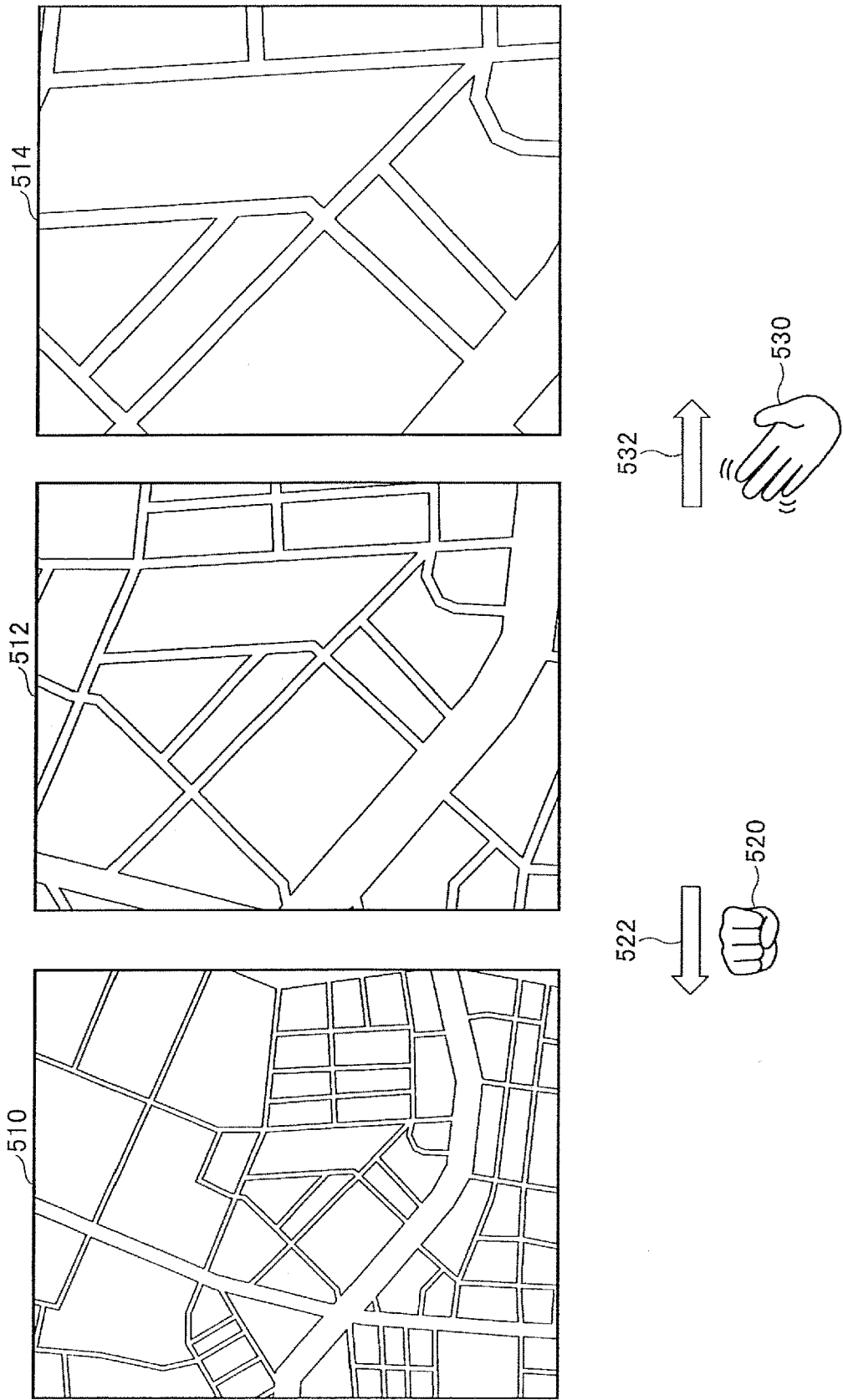

METHOD, NON-TRANSITORY COMPUTER-READABLE MEDIUM, AND DEVICE FOR CONTROLLING A USER-INTERFACE

CROSS-REFERENCE TO RELATED APPLICATIONS

The present application claims the benefit of priority under 35 U.S.C. § 119 of Japanese Patent Application No. 2016-201171, filed Oct. 12, 2016, the contents of which are incorporated herein by reference in their entirety.

BACKGROUND OF THE INVENTION

1. Field of the Invention

The present disclosure relates to methods, non-transitory computer-readable media, and devices for controlling a user-interface.

2. Description of the Related Art

Various applications can run on devices having a central processing unit (CPU) such as mobile terminals including a mobile phone, a tablet computer, etc., a music playing device, and a laptop computer. On such applications, user-interfaces are provided, so as to receive instructions from a user and to provide information to a user.

Each of applications that runs on such a device as mentioned above is individually designed to achieve interaction between a user and a device in an individual manner by use of an individual user-interface. Needless to say, basic user-interfaces provided by an operating system are made uniform in many cases, with respect to applications that run on the same operating system. Furthermore, the same user-interface is often employed for a group of applications developed by the same company on the same design concept.

However, on a worldwide basis, there are multiple operating systems and, in the level of operating systems, there are various peripheral devices which are supported by each operating system. Therefore, even such basic user-interfaces may differ from each other, depending on operating systems. Furthermore, even among a group of applications developed by the same company on the same design concept, some may have user-interfaces which are partially different from each other. Furthermore, even the same applications in different versions may have different user-interfaces. Therefore, interaction between a user and a device can be different in many cases, depending on applications.

Furthermore, at the time of driving a car, etc., a user cannot use a mobile terminal in some cases, which causes a problem in manipulating an application.

Taking a case of zooming in a screen-display as an example, there are various types of instructions such as one performed through pinching out, one performed through double-clicking of a mouse, or one performed through rolling a wheel of a mouse, depending on applications.

That is to say, even for providing the same kind of instructions, a user is required to provide different operations in many cases, depending on applications. Moreover, while driving, for example, there are cases in which a user suffers from manipulation itself.

To attend to such cases, there a technique for replacing user operations performed through an interface with other operations.

For example, as related art, there is a device having a voice and/or manual user-interface for accessing functions of the device. The functions are accessible through a hierarchy of menus. The voice and/or manual user-interface enables short-cutting branches of the hierarchy of menus by means of a voice instruction, which is referred to as a voice short-cut. The device includes a unit for storing sequences of interaction performed by a user, a unit for detecting a voice short-cut corresponding to one of the sequences of interaction, and a unit for sending a message to the user, in a case of detecting a voice short-cut, in order to inform the user of existence of the voice short-cut (see, for example, Japanese Unexamined Patent Application Publication No. 2000-231398).

Furthermore, as related art, there is a user-interface for querying and displaying records from a database. According to the related art, user profiles are presented and manipulated to operate with queries in the same way as other criteria. For example, "implicit" profiles can be added to a query in the same manner as more typical preference profiles in which users incorporate their explicit preferences in the form of rules into a user profile (see, for example, Japanese Translation of PCT International Application Publication No. JP-T-2003-529154).

However, such techniques of replacing operations are intended for reducing trouble of a person who manipulates specific applications, by means of providing a shortcut, etc. Therefore, such conventional techniques require each application to be designed so as to operate in accordance with corresponding manipulations performed by a user.

As in the past, application developers are required to develop a user-interface per an application and users are required to learn how to manipulate each user-interface.

Therefore, in a variety of usage situations, accessibility of a user to various applications is desired to be enhanced.

SUMMARY OF THE INVENTION

The object of the disclosed technique is to enhance accessibility of a user to various applications.

One aspect of the present invention provides a method for controlling a user-interface that provides an instruction to an application through a user-operation which is performed on a display provided on a device. The method includes a process performed by the device. The process includes: acquiring information displayed by the display; extracting at least one feature existing on the acquired information; receiving an action of a user; searching a database to identify a predetermined operation, which corresponds to the received action and the extracted at least one feature; and providing an instruction to the application through applying the identified predetermined operation, not the received action, to the user-interface.

The disclosed technique enables enhancing accessibility of a user to various applications.

BRIEF DESCRIPTION OF THE DRAWINGS

FIG. 3 is a drawing illustrating an example of operating definitions according to an embodiment of the present invention;

FIG. 5 is a drawing illustrating an example of instructing for zooming in and zooming out of a screen;

DESCRIPTION OF THE EMBODIMENTS

<Example of a Configuration>

Figure 1:
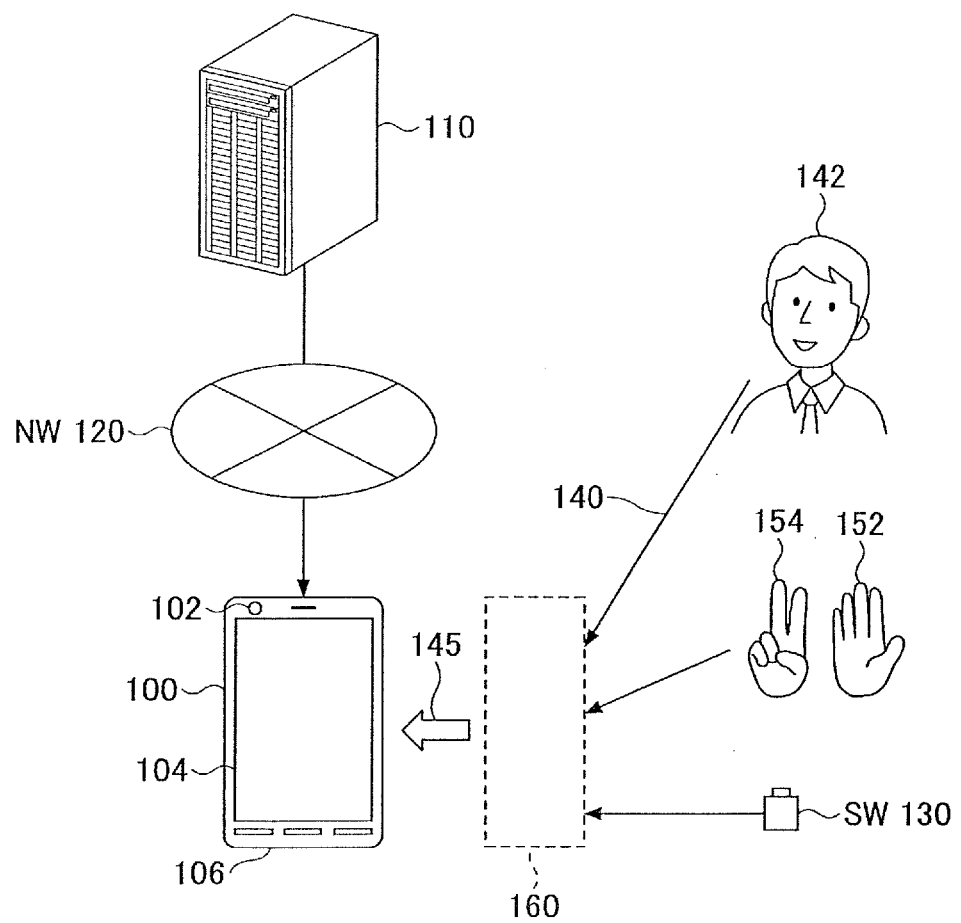
FIG. 1 is a drawing illustrating an example of a configuration according to an embodiment of the present invention.

An example of a configuration according to an embodiment of the present invention is illustrated in FIG. 1. The configuration according to an embodiment of the present invention includes a mobile terminal 100, a server device 110, and an interface device 160. Note that the server device 110 and the interface device 160 are not necessary; an embodiment of the present invention may be actualized only by the mobile terminal 100.

An embodiment of the present invention may be implemented, for example, as a program that runs on the mobile terminal 100. Moreover, the mobile terminal 100 may cooperate with other devices (e.g. the server device 110, the interface device 160, etc.) to actualize an embodiment of the present invention. An embodiment of the present invention may be actualized as an invention of process. Furthermore, an embodiment of the present invention may be actualized as an invention of product such as a device.

The interface device 160 receives information such as a voice 140 pronounced by a user 142, a finger gesture 152 or a gesture 154 of a person, or a signal from a switch SW130. The interface device 160 is capable of converting the received information into an electric signal and transmitting the converted information to the mobile terminal 100 via a wired or wireless communication 145.

The mobile terminal 100 is mounted with a communicating function by use of, for example, a mobile telephone network, a wireless local area network (Wifi), a Bluetooth (registered trademark), or a near field communication (NFC). The mobile terminal 100 is capable of communicating with various computers such as other mobile terminals or the server device 110 by means of the communicating function, for example, via a network such as an Internet or a peer-to-peer (P2P) communication, in order to transmit various types of information.

Note that the mobile terminal 100 may receive information such as the voice 140, the finger gesture 152 or the gesture 154 of a person, or a signal based on the switch SW130, without being mediated by the interface device 160. The mobile terminal 100 may include one or more cameras 102, so as to capture, for example, the finger gesture 152 or the gesture 154 of a person, etc., as a moving image or a still image. Furthermore, the mobile terminal 100 may be able to collect the voice 140 pronounced by the user 142, using a microphone 106. Moreover, the mobile terminal 100 may receive an instruction that is input by the user 142 using the switch SW130 connected with the mobile terminal 100. The mobile terminal 100 may be provided with a terminal (not illustrated) for connecting with the switch SW130. Alternatively, the mobile terminal 100 and the switch SW130 may be connected wirelessly. Furthermore, the mobile terminal 100 includes a display 104. According to an embodiment of the present invention, a screen-display of the display 104 is utilized for pattern recognition.

In an embodiment of the present invention, updated information of a database may be provided to the mobile terminal 100 from the server device 110 via a network NW120, as described in the following description. Alternatively, the mobile terminal 100 may transmit a search-command to a database established in the server device 110 via the network NW120, so as to receive a search-result from the server device 110. A database described below is only required to be established in any one of hardware elements connected to the network NW120.

Note that, although the illustrated mobile terminal 100 has a shape of a mobile phone in FIG. 1, the mobile terminal 100 is not limited to be a mobile phone. For example, the mobile terminal 100 may be a hardware element mounted on a front panel of a car. Alternatively, the mobile terminal 100 may be a wristwatch with a communicating function or may be other wearable devices. In addition, the interface device 160 may be a hardware element mounted on a steering wheel of a car, etc.

Figure 2A:
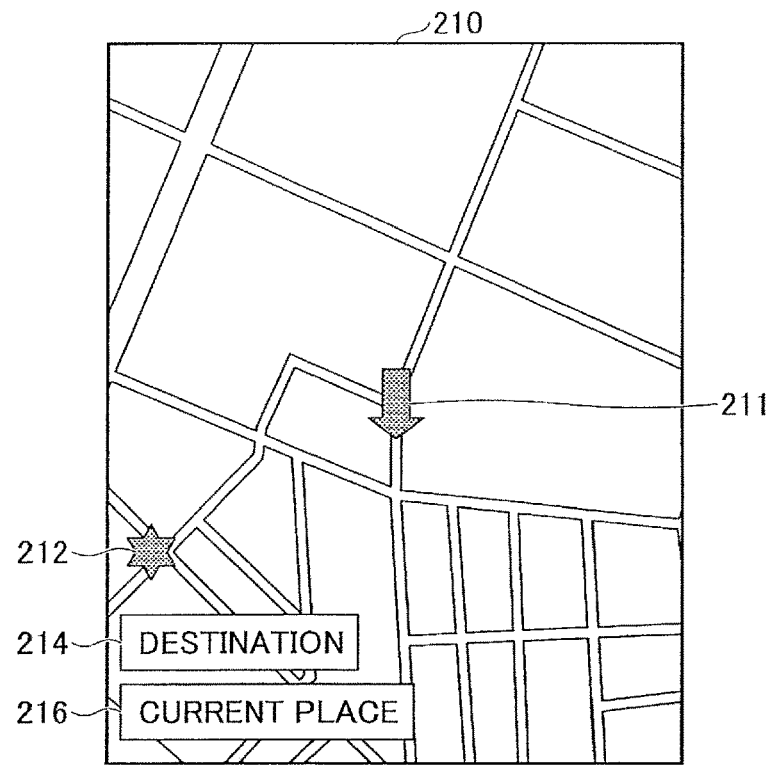
FIGS. 2A and 2B are drawings for explaining an overview of functions according to an embodiment of the present invention.
Figure 2B:
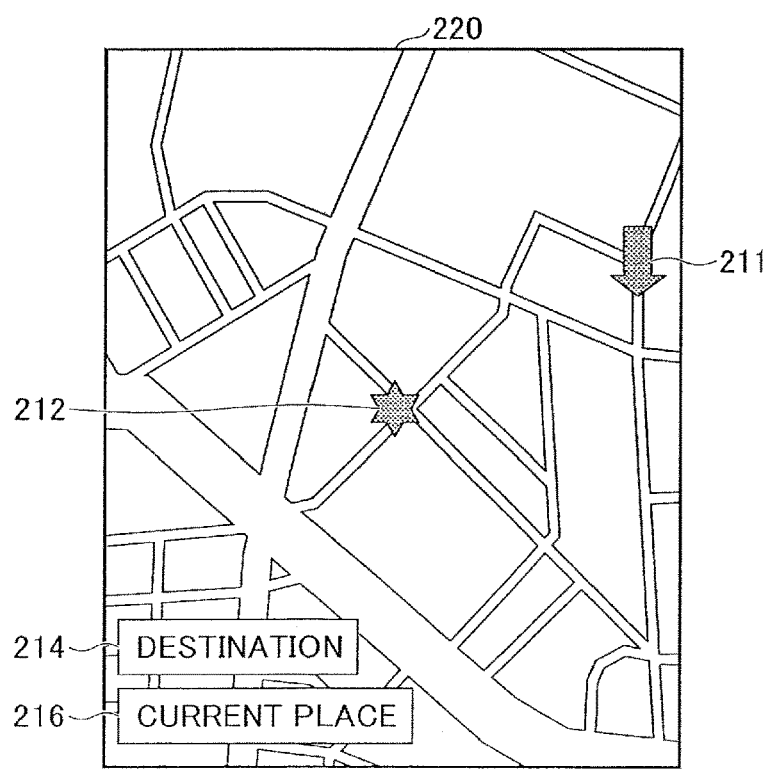

FIGS. 2A and 2B are drawings illustrating an overview of functions of an embodiment of the present invention.

More specifically, control of a user-interface of a mapping application (i.e. an application for displaying a map that runs on the mobile terminal 100), which is performed according to an embodiment of the present invention, is illustrated in FIGS. 2A and 2B.

First, the following description explains an operation of the mapping application illustrated in FIGS. 2A and 2B. Then, explanation of an embodiment of the present invention follows.

<Explanation of an Ordinary Operation of the Mapping Application>

In FIG. 2A, a screen-display 210 of the mobile terminal 100 is illustrated. A mark 211 in a shape of an arrow is a symbol indicating a destination on the map. A mark 212 in a shape of a star is a symbol indicating a current place (i.e. a current location of the mobile terminal 100).

A "DESTINATION" button 214, which is displayed in a square frame, is provided for displaying a destination at the center of the screen. A user can tap on the "DESTINATION" button 214 with a finger, so as to provide an instruction for displaying a destination at the center of the screen to the mapping application. The screen-display 210 illustrated in FIG. 2A is a screen displayed right after tapping on the "DESTINATION" button 214. Therefore, the mark 211 in the shape of an arrow, which indicates a destination, is displayed at the center of the screen-display 210.

A "CURRENT PLACE" button 216, which is displayed in a square frame, is provided for displaying a current place at the center of the screen. A user can tap on the "CURRENT PLACE" button 216 with a finger, so as to provide an instruction for displaying a current place at the center of the screen to the mapping application.

A screen-display 220 illustrated in FIG. 2B is a screen displayed right after tapping on the "CURRENT PLACE" button 216. Therefore, the mark 212 in the shape of a star, which indicates a current place, is displayed at the center of the screen-display 220.

<Explanation of an Operation According to the First Embodiment>

Description of the first embodiment explains an example of providing an instruction to the mapping application through a voice of a user. Note that the following description explains an overview of an operation according to the first embodiment, with reference to FIGS. 2A and 2B, and then subsequently explains details of the operation.

The mapping application has a function to receive an instruction from a user through a tap on the screen. According to the first embodiment, a user can provide, to the mapping application, the same instruction corresponding to a tap on the screen, for example, through a voice of the user, instead of a tap on the screen.

For achieving the above function, according to the first embodiment, the screen-display 210 is analyzed, so that it is recognized that the "DESTINATION" button 214 and the "CURRENT PLACE" button 216 exist on the screen of the mapping application. For performing such recognition according to the first embodiment, a person skilled in the art need prepare for feature-extraction, by use of widely known conventional techniques relating to pattern recognition. Note that it is possible to identify a mapping application, based on the positions of the "DESTINATION" button 214 and the "CURRENT PLACE" button 216, which are on the bottom-left of the screen-display. Further, it is also possible to identify a mapping application, based on such features of the "DESTINATION" button 214 and the "CURRENT PLACE" button 216 as being in square shapes. Identification of a mapping application enables estimating behavior of the mapping application more accurately. Therefore, identification of a model of a mapping application is preferred.

Moreover, faster pattern recognition may be possible in a case where information of a model of a mapping application is acquirable from an operating system, because, for example, the layout of a screen-display of the mapping application can be estimated and therefore pattern recognition on the "DESTINATION" button 214 and the "CURRENT PLACE" button 216 may be initiated from a predetermined position of the screen-display.

According to the first embodiment, in a case where a user pronounces "CURRENT PLACE", an operation corresponding to a tap on the "CURRENT PLACE" button 216 is provided to the mapping application. That is to say, for example, in the case where a user pronounces "CURRENT PLACE", a program implementing the first embodiment recognizes that the user has pronounced "CURRENT PLACE". Then, the program implementing the first embodiment transmits, to the operating system of the mobile terminal 100, an event indicating that a tap is performed on the screen position corresponding to the "CURRENT PLACE" button 216. Then, the operating system provides, to the mapping application, information that a tap is performed on the screen position corresponding to the "CURRENT PLACE" button 216, so that the mapping application recognizes that an instruction of tapping on the "CURRENT PLACE" button 216 is provided. Thus, the mapping application displays, on the screen-display 220, a map having the mark 212 in the shape of a star, which indicates a current place, at the center of the screen-display 220, as illustrated in FIG. 2B.

In a case where a user pronounces "DESTINATION", the program implementing the first embodiment transmits, to the operating system, information that a tap is performed on the "DESTINATION" button 214. Then, the operating system provides, to the mapping application, information that a tap is performed on the screen position corresponding to the "DESTINATION" button 214, so that the mapping application recognizes that an instruction of tapping on the "DESTINATION" button 214 is provided. Thus, the mapping application displays, on the screen-display 210, a map having the mark 211 in the shape of an arrow, which indicates a destination, at the center of the screen-display 210, as illustrated in FIG. 2A. Detailed explanation of the above operations is provided in the following description, with reference to FIG. 7, FIG. 8, etc.

<Second Embodiment>

FIG. 3 is a drawing illustrating an example of operating definitions according to the second embodiment.

According to a table 300 illustrated in FIG. 3, predetermined instructions may be provided to various applications (i.e. an application X, an application Y, an application Z) through actions of a user, which may be gestures or voices. The following description explains the table 300 in detail.

In a column 310, gestures to be recognized as an action of a user for providing a corresponding instruction to each of the applications are illustrated.

In a column 312, voices to be recognized as an action of a user for providing a corresponding instruction to each of the applications are illustrated.

In a column 314, instructions to be provided to each of the applications are illustrated.

In a column 316, ordinary operations for causing the application X to execute a corresponding instruction are illustrated.

In a column 318, ordinary operations for causing the application Y to execute a corresponding instruction are illustrated.

In a column 319, ordinary operations for causing the application Z to execute a corresponding instruction are illustrated.

As an example, the following description explains a case in which the mobile terminal 100 recognizes, as an action of a user (gesture), an "action of pointing down with an index finger", which is illustrated at the column 310, a row 340, by use of the camera 102 provided on either the interface device 160 or the mobile terminal 100. In the example, the action of a user indicates an instruction "INSTRUCTION FOR DISPLAYING A CURRENT PLACE AT THE SCREEN CENTER", which is illustrated at the column 314, the row 340. Similarly, the same instruction is indicated in a case of recognizing "CURRENT PLACE" pronounced by a user.

Thus, as for the above example, in a case where the application X is running, the program implementing the second embodiment executes "PROVIDING AN OPERATION OF TAPPING ON "CURRENT PLACE" TO THE APPLICATION X". As a result, the application X displays a current place at the center of the screen. The operating system may cooperate at the time of providing the operation to the application X.

Furthermore, in a case where the application Y is running, the program implementing the second embodiment executes "PROVIDING AN OPERATION OF TAPPING ON "CURRENT PLACE" TO THE APPLICATION Y". As a result, the application Y displays a current place at the center of the screen. The operating system may cooperate at the time of providing the operation to the application Y.

Furthermore, in a case where the application Z is running, the program implementing the second embodiment executes "PROVIDING AN OPERATION OF TAPPING ON SYMBOL B TO THE APPLICATION Z". As a result, the application Z displays a current place at the center of the screen.

In a case where another action of a user (gesture or voice) is recognized, a corresponding operation illustrated in the table 300 is provided to a currently running application, so as to provide a corresponding instruction to the currently running application.

Note that, although in the table 300 both of a gesture and a voice correspond to each instruction, as actions of a user, each instruction may correspond to either one of a gesture or a voice.

Note that a gesture of a user may be recognized, for example, by means of techniques relating to pattern recognition that are widely known by people skilled in the art, based on images captured by the camera 102 provided on the mobile terminal 100. Furthermore, a voice of a user may be recognized, for example, by means of techniques relating to pattern recognition known by people skilled in the art, based on an audio signal acquired by the microphone 106 provided on the interface device 160 or the mobile terminal 100.

For example, by use of the switch SW130 illustrated in FIG. 1, an action of a user may be recognized by counting the number of times pressing the switch SW130 in a predetermined period of time (not illustrated). Moreover, an action of a user may be recognized by use of various types of sensors 1162 (see, FIG. 10) provided on the mobile terminal 100 (not illustrated).

According to the second embodiment, a user can provide an instruction to an application through a simple action such as an easy gesture or pronunciation of a voice, with respect to an application that ordinarily requires a user to perform a predetermined complicated operation including tapping and clicking on a screen, etc., in order to provide an instruction.

Furthermore, with respect to multiple applications that require a user to perform different operations in order to provide the same instructions, respectively, a user is enabled to provide the same instructions through performing the same actions.

Additionally, it is enabled to freely modify a user-interface without modifying an individual application.

Furthermore, by connecting a device that automatically generates a predetermined switching operation, instead of connecting the switch SW130, the embodiment of the present invention may be utilized for a purpose of automatically checking behavior of an application without operations of a user.

Furthermore, a user is enabled to provide a desired instruction to an application through a gesture or a voice of the user, while being in a situation where the user cannot manipulate the mobile terminal 100 such as while driving a car.

Figure 4A:
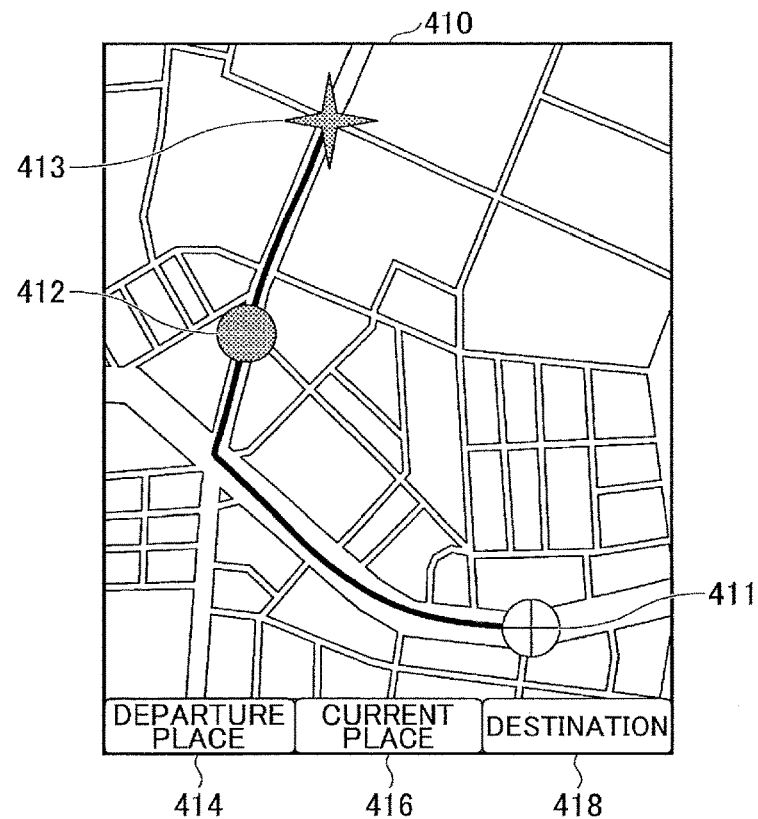
FIGS. 4A and 4B are drawings illustrating examples of specific displays of an application.
Figure 4B:
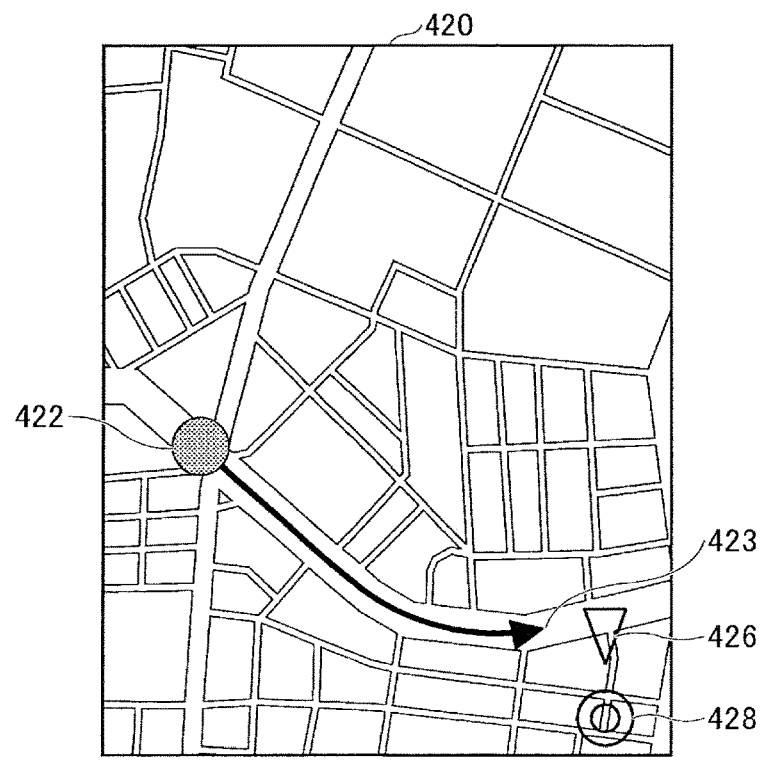

FIGS. 4A and 4B are drawings illustrating examples of specific displays performed by multiple applications as illustrated in FIG. 3.

In FIG. 4A, an example of a screen of the application Y as illustrated in the column 318 of FIG. 3 is illustrated. Displays of a departure place 414, a current place 416 and a destination 418 exist at the bottom of a map 410, from the left to the right. Additionally, the map 410 includes a mark 411 in a shape of a cross, which indicates a departure place, a mark 412 in a shape of a black dot, which indicates a current place, and a mark 413 in a shape of a star, which indicates a destination, as well as a route connecting the marks illustrated with a black line. For example, in a case of clicking on the departure place 414, the mark 411 in the shape of a cross, which indicates a departure place, is displayed at the center of the map 410. Furthermore, the program implementing the second embodiment provides an operation of clicking on the "DEPARTURE PLACE" button to the application Y, in response to a gesture of pointing up with an index finger or to pronunciation of "DEPARTURE PLACE" performed by a user, as illustrated in the row 330 of FIG. 3. In such a way, the mark 411 in the shape of a cross, which indicates a departure place, is displayed at the center of the map 410, similarly to the case of performing the ordinary operation as described above.

Furthermore, the program implementing the second embodiment is capable of recognizing that a screen of the application Y is being displayed, based on the feature that the departure place 414, the current place 416 and the destination 418 exist at the bottom of the map 410, from the left to the right. By recognizing a running application, the program implementing the second embodiment is capable of providing an operation that corresponds to an instruction more properly.

In FIG. 4B, an example of a screen of the application Z as illustrated in the column 319 of FIG. 3 is illustrated. A symbol A 426 in a shape of an inverted triangle and a symbol B 428 in a shape of a double circle are displayed at the bottom right of the screen-display 420. It is recognized that the application Z is running, based on the two symbols existing at the bottom right of the screen-display 420.

A mark 422 in a shape of a black dot indicates a current place. The tip 423 of an arrow indicates a destination. For example, when the symbol A 426 in the shape of an inverted triangle is tapped, the tip 423 of the arrow that indicates a destination is displayed at the center of the screen-display 420. The program implementing the second embodiment provides an operation of tapping on the symbol A 426 to the application Z, in response to a gesture of pointing up with an index finger or to pronunciation of "DESTINATION" performed by a user, as illustrated in the row 350 of FIG. 3. In such a way, the tip 423 of the arrow that indicates a destination is displayed at the center of the screen-display 420, similarly to the case of performing the ordinary operation as described above.

FIG. 5 is a drawing illustrating an example of instructing for zooming in and zooming out of a screen.

In FIG. 5, a screen-display 512, which is a zoomed-in image of a screen-display 510, is illustrated. Furthermore, a screen-display 514, which is a further zoomed-in image of the screen-display 512, is illustrated.

A gesture 520 of forming a first as illustrated in FIG. 5 is the same gesture as illustrated in the row 370 of FIG. 3. As an example, in a case where the gesture 520 is recognized at the time of displaying the screen-display 514, the screen-display 514 is zoomed out to display the screen-display 512. Furthermore, as an example, in a case where the gesture 520 is recognized at the time of displaying the screen-display 512, the screen-display 512 is zoomed out to display the screen-display 510.

A gesture 530 of opening a hand as illustrated in FIG. 5 is the same gesture as illustrated in the row 360 of FIG. 3. As an example, in a case where the gesture 530 is recognized at the time of displaying the screen-display 510, the screen-display 510 is zoomed in to display the screen-display 512. Furthermore, as an example, in a case where the gesture 530 is recognized at the time of displaying the screen-display 512, the screen-display 512 is zoomed in to display the screen-display 514.

Arrows 522 and 532 indicate directions of screen transition, corresponding to the gestures 520 and 530, respectively.

In such a way as described above, operations of zooming in and zooming out of a screen may be performed more easily through predetermined gestures of a user. The above processing is similarly performed in a case where the user performs an action of pronouncing "ZOOM IN" or "ZOOM OUT".

Additionally, operations of zooming in and zooming out may be performed through other actions of a user, by setting up the various types of sensors 1162 so as to recognize the other actions of the user.

Figure 6:
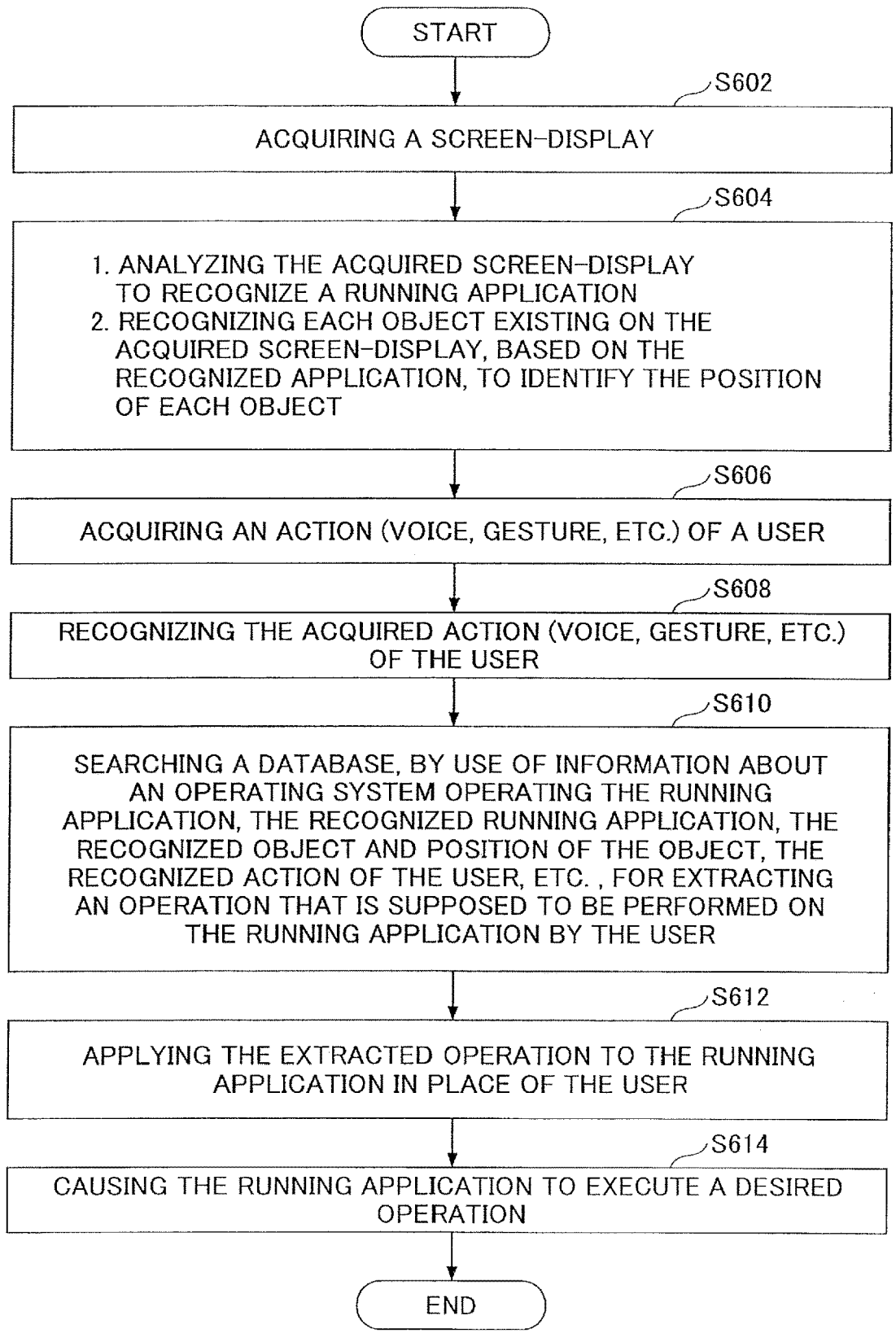
FIG. 6 is a flowchart illustrating operations according to an embodiment of the present invention.

FIG. 6 is a flowchart illustrating operations according to an embodiment of the present invention.

At Step S602, the program implementing an embodiment of the present invention acquires a screen-display.

At Step S604, the program implementing an embodiment of the present invention performs such operations as follow:
1. analyzing the acquired screen-display to recognize a running application; and
2. recognizing each object existing on the acquired screen-display, based on the recognized application, to identify the position of each object.

Note that, although the program analyzes an acquired screen-display to recognize a running application at Step S604, the program may acquire information of a running application from the operating system.

At Step S606, the program implementing an embodiment of the present invention acquires an action (e.g. a voice, a gesture, etc.) of a user.

At Step S608, the program implementing an embodiment of the present invention recognizes the acquired action (e.g. a voice, a gesture, etc.) of the user.

At Step S610, the program implementing an embodiment of the present invention searches a database, by use of information about an operating system operating the running application, the recognized running application, the recognized object and position of the object, the recognized action of the user, etc., for extracting an operation that is supposed to be performed on the running application by the user. Note that, with respect to the information of the operating system, the program implementing an embodiment of the present invention may acquire information for identifying the operating system directly from the operating system. Furthermore, as described above, the information for identifying the running application may be acquired directly from the operating system.

At Step S612, the program implementing an embodiment of the present invention applies the extracted operation to the running application in place of the user.

At Step S614, the program implementing an embodiment of the present invention causes the running application to execute a desired operation.

As described above, according to an embodiment of the present invention, because of recognition of a screen-display, a user can flexibly provide an operation that corresponds to an instruction, which is properly based on the screen-display. In such a way, a user can properly provide a desired instruction to a mobile terminal while being in a situation where the user cannot directly manipulate the screen of the mobile terminal, such as while driving a car.

Furthermore, the above effect may be achieved without modifying a program of an application.

Figure 7:
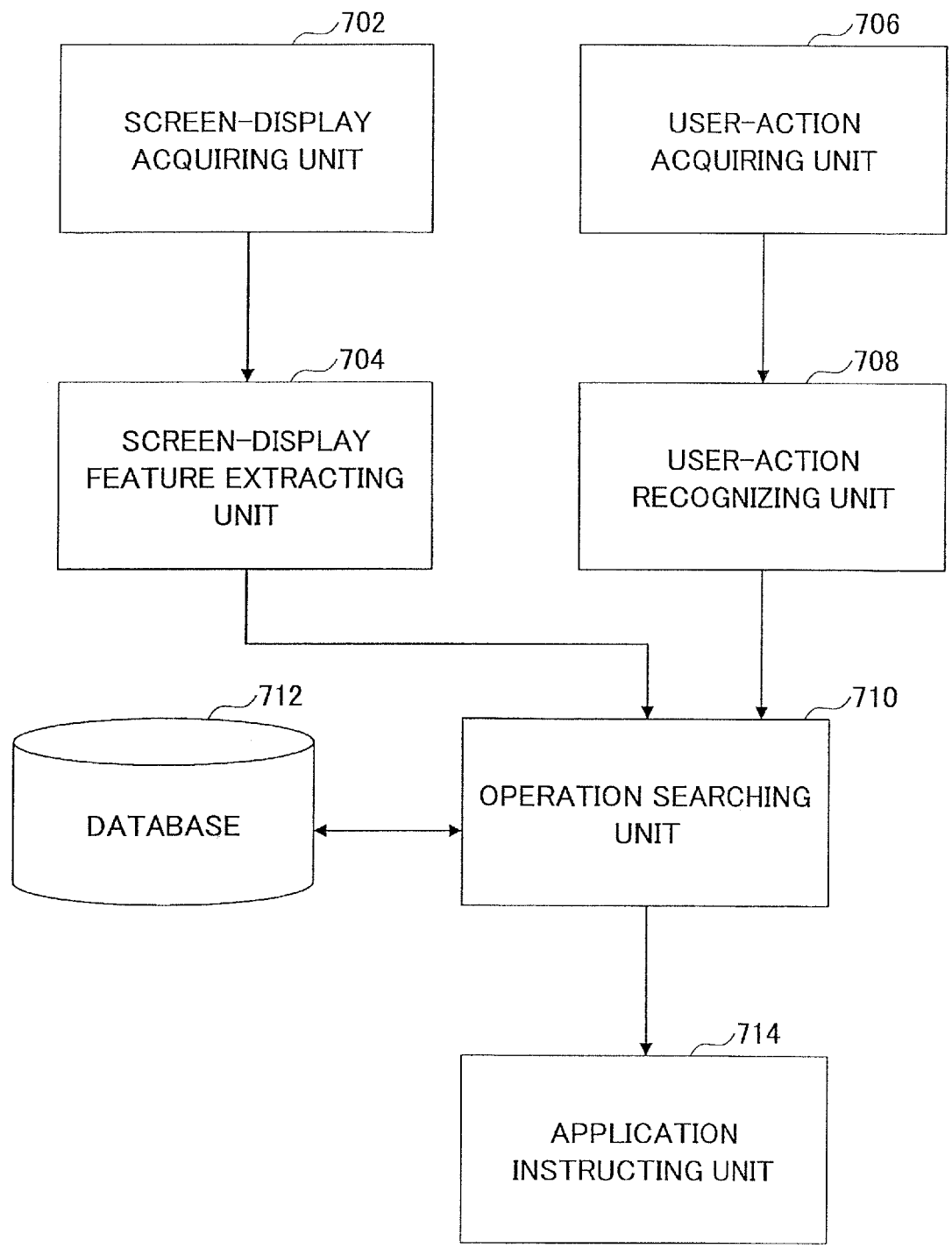
FIG. 7 is a drawing illustrating an example of an operating environment for a user-interface control program, which implements an embodiment of the present invention.

FIG. 7 is a functional block diagram of an embodiment of the present invention.

A screen-display acquiring unit 702 (i.e. a display acquiring unit) acquires a screen-display of the mobile terminal 100. The screen-display may be an image. The screen-display may be acquired from, for example, an operating system. The screen-display may also be acquired, based on a depiction-signal transmitted to the screen. Alternatively, the screen-display may also be acquired by capturing an image of the screen using a camera, etc.

A screen-display feature extracting unit 704 (i.e. a feature extracting unit) extracts at least one feature from the acquired screen-display. The feature may be, for example, a display of a symbol and a button to be tapped on, positions of the symbol and the button, and a feature to be used for identifying an application.

A user-action acquiring unit 706 (i.e. an action receiving unit) acquires, for example, an image of an action made by a hand of a user, sound information pronounced by a user, and information of pressing a switch.

A user-action recognizing unit 708 acquires, for example, a recognition result of a hand of a user, a recognition result of a voice, information about expression of the face of a user, an authentication result of a user, and the number of times pressing a switch in a predetermined period of time.

An operation searching unit 710 (i.e. a searching unit) searches a database 712 by use of information obtained by the screen-display feature extracting unit 704, the user-action recognizing unit 708, and other information (such as identification information of an operating system), in order to extract an operation corresponding to a desired instruction. Note that, as described above, the operation searching unit 710 may acquire, from the operating system, information about a model of an application currently displayed on the foreground of the display 104 of the mobile terminal 100, in order to utilize the information for the search of the database 712. Alternatively, the information about the model of the application currently displayed on the foreground of the display 104 of the mobile terminal 100 may be extracted by the screen-display feature extracting unit 704, based on the acquired feature of the screen-display.

An application instructing unit 714 (i.e. an instructing unit) provides the extracted instruction to the running application in place of a user. As a result, a desired instruction is provided to the application. Then, the application executes processing based on the instruction.

Figure 8:
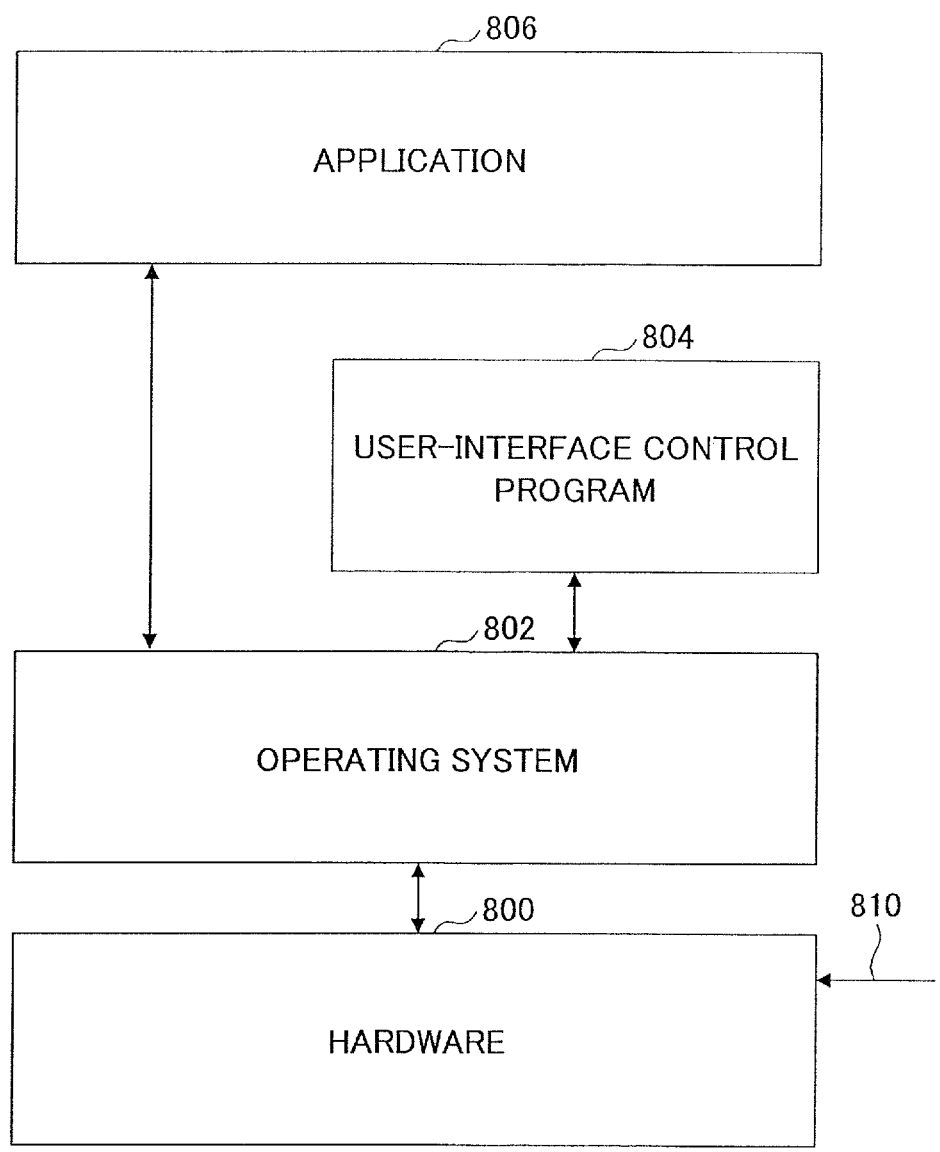
FIG. 8 is a drawing illustrating an example of the operating environment for the user-interface control program, which implements an embodiment of the present invention.

FIG. 8 is a drawing illustrating an example of an operating environment for a user-interface control program that implements an embodiment of the present invention.

An application 806 is an application to which the program implementing an embodiment of the present invention provides an operation in place of a user.

A user-interface control program 804 is a program implementing an embodiment of the present invention. The application 806 and the user-interface control program 804 may be run on an operating system 802 provided in the mobile terminal 100. Note that an action-of-user 810 (e.g. a gesture, a voice, etc.) is acquired by hardware 800, and then transmitted to the operating system 802.

The above operating environment is provided as an example, and therefore an embodiment of the present invention is not restricted to have the above operating environment.

Figure 9:
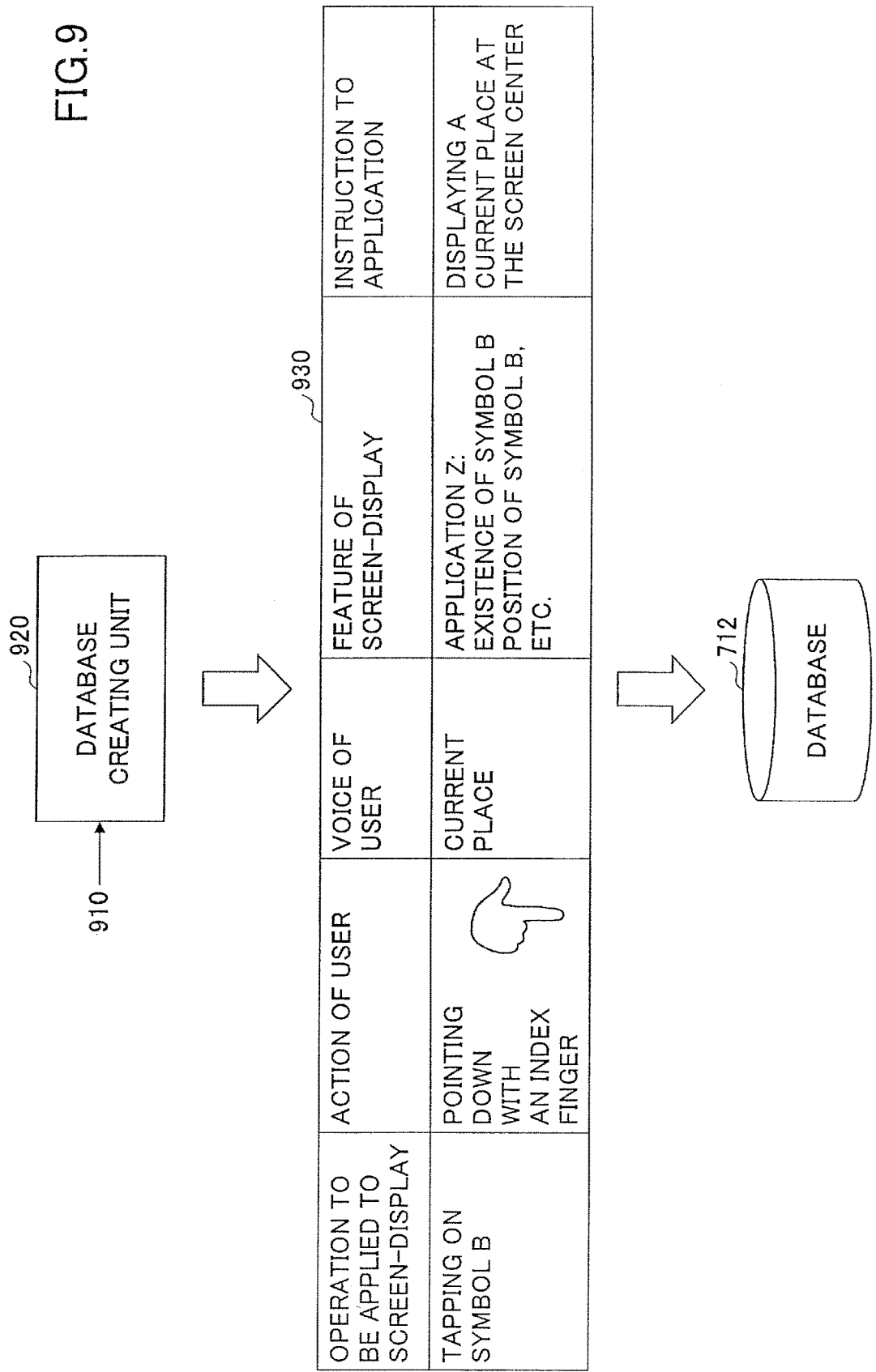
FIG. 9 is a drawing illustrating an example of creating a database for extracting a proper instruction and operation, based on an action of a user and a result of feature-extraction performed on a screen-display, etc.

FIG. 9 is a drawing illustrating an example of creating a database for extracting a proper instruction and operation, based on an action of a user and a result of feature-extraction performed on a screen-display, etc.

As illustrated in FIG. 9, an operator 910 may input, to a database creating unit 920, entry information 930 to be stored in the database 712, so that the entry information 930 is stored in the database 712.

The entry information 930 represents an entry having a content of instructing an application for "DISPLAYING A CURRENT PLACE AT THE SCREEN CENTER", as illustrated in a column of "INSTRUCTION TO APPLICATION".

That is to say, in a case where "FEATURE OF SCREEN-DISPLAY" is "APPLICATION Z", "EXISTENCE OF SYMBOL B", and "POSITION OF SYMBOL B", which is at a predetermined position, then an operation of applying "TAPPING ON SYMBOL B" to the screen-display is set up to be extracted, in response to recognition of an action or a voice of a user, which is either one of (a) or (b) as follows:
(a) "ACTION OF USER" is "POINTING DOWN WITH AN INDEX FINGER"; or
(b) "VOICE OF USER" is "CURRENT PLACE".

A searching example of the database storing such entry information 930 is as follows.

"OPERATION TO BE APPLIED TO SCREEN-DISPLAY" may be extracted by searching the database, using recognized "FEATURE OF SCREEN-DISPLAY" and "ACTION OF USER" as search keys. Furthermore, "OPERATION TO BE APPLIED TO SCREEN-DISPLAY" may be extracted by searching the database, using recognized "FEATURE OF SCREEN-DISPLAY" and "VOICE OF USER" as search keys.

In such a way as described above, an entry on a database, which is to display a current place while the application Z is running, is completed.

For completing creating a database, each entry is created and stored in the database through the above processes, so as to cover operations with respect to each of the applications.

<Modification Example>

Although, in the above embodiments, an action of a user is acquired and the acquired action of a user is recognized, an embodiment of the present invention is not restricted to acquiring an action of a user. For example, an image, a drawing, a letter on a paper, a displayed object, or a picture including captured information of scenery or an object may be acquired for the purpose of recognition.

An embodiment of the present invention may be actualized by one or more programs, which may be executed on one or more hardware elements. Furthermore, an embodiment of the present invention may be configured with multiple devices, and may be actualized by multiple devices cooperating via a communication line, etc.

As an embodiment of the present invention, the screen-information of the mobile terminal 100 may be encrypted at the time of receiving the screen-display.

The acquired screen-display may be, for example, a part of a screen-display of the mobile terminal 100.

Furthermore, a predetermined mark, etc., which complies with the program implementing an embodiment of the present invention, may be displayed on a part of the screen-display. In such a way, the program implementing the embodiment of the present invention can confirm the screen-display having a user-interface, which is to be controlled by the program implementing the embodiment of the present invention.

<Example of a Hardware Configuration>

Figure 10:
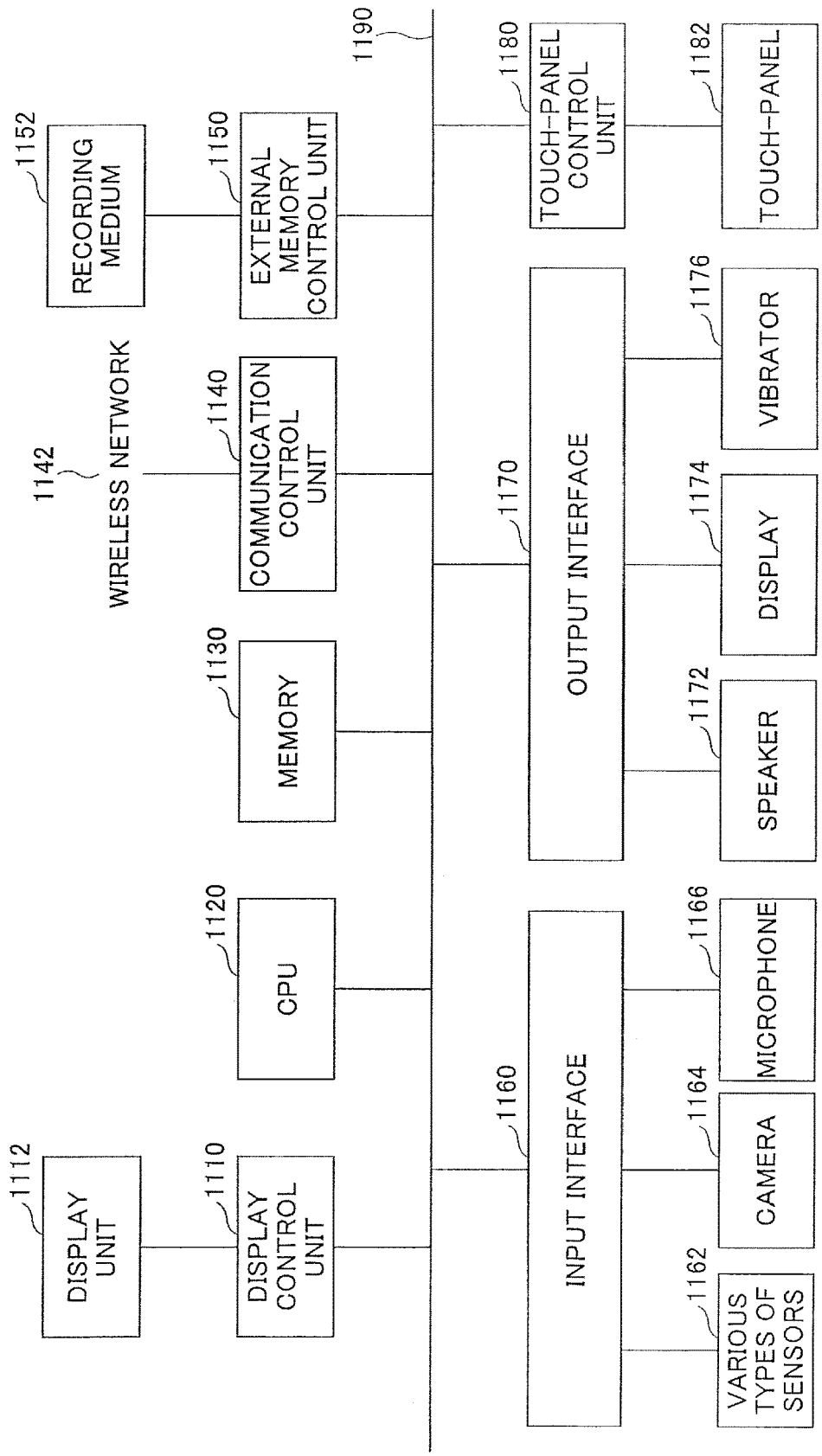
FIG. 10 is a drawing illustrating an example of a hardware configuration.

FIG. 10 is a drawing illustrating a hardware configuration of the mobile terminal 100 and the server device 110. In FIG. 10, hardware configurations of the mobile terminal 100 and the server device 110 are illustrated as a whole.

The hardware configuration includes a display control unit 1110, a display unit 1112, a CPU 1120, a memory 1130, a communication control unit 1140, an external memory control unit 1150, a recording medium 1152, an input interface 1160, various types of sensors 1162, a camera 1164, a microphone 1166, an output interface 1170, a speaker 1172, a display 1174, a vibrator 1176, a touch-panel control unit 1180, a touch-panel 1182, etc. Note that, although the communication control unit 1140 is connected to a wireless network 1142 to perform communication, the communication control unit 1140 may be connected to a wired network 1142 to perform communication. Additionally, the constituent elements are interconnected via a bus 1190.

The mobile terminal 100 and the server device 110 may not include some of the above hardware elements and may include other hardware elements.

Note that a part or the entirety of an embodiment of the present invention may be implemented by a program. The program may be stored in the recording medium 1152. The recording medium 1152 indicates one or more non-transitory tangible recording medium (i.e. a non-transitory computer-readable medium). For example, the recording medium 1152 may be a magnetic recording medium, an optical disk, a magneto-optical recording medium, a semiconductor memory, a nonvolatile memory, etc. Examples of the semiconductor memory include a random access memory (RAM), a read-only memory (ROM), a secure digital (SD) memory, etc. Examples of the magnetic recording medium include a hard disk drive (HDD), a flexible disk (FD), a magnetic tape (MT), etc. Examples of the optical disk include a digital versatile disc (DVD), a DVD-RAM, a compact disk-read only memory (CD-ROM), CD-R (recordable), CD-RW (rewritable), etc. Furthermore, examples of the magneto-optical recording medium include a magneto-optical (MO) disk. The program stored in the recording medium is retrieved and executed by the CPU, so as to implement a part or the entirety of each embodiment.

It should be noted that each of the embodiments is provided for helping understanding of the present invention, and therefore the scope of the present invention is not limited to the embodiments. Furthermore, the above multiple embodiments are not mutually exclusive. Therefore, note that it is intended that each element of different embodiments may be combined, as long as not involving any contradictions. Furthermore, processing according to the claimed invention of a method and a program may be executed in a changed order or executed simultaneously, as long as not involving any contradictions. Additionally, needless to say, such embodiments are included in the scope of the claimed invention.

Furthermore, needless to say, the scope of the present invention includes not only a case in which a computer executes retrieved program code so as to actualize functions of the above embodiments, but also a case in which another program such as an operating system running on a computer executes a part or the entirety of actual processing, so as to actualize the functions of the embodiments in accordance with instructions based on the program code.

Furthermore, constituent elements of the embodiments may be actualized by hardware elements which are physically apart from each other. Additionally, each of the constituent elements of the embodiments of the present invention may be actualized by divided multiple virtual machines which are operated on a single computer.

Further, the present invention is not limited to these embodiments, but various variations and modifications may be made without departing from the scope of the present invention.

What is claimed is:

1. A method for controlling a user-interface that provides an instruction to an application through a user-operation which is performed on a display provided on a device, the method comprising a process performed by the device, wherein the process includes:
   acquiring information displayed by the display;
   extracting at least one feature existing on the acquired information;

receiving an action of a user;

searching a database to identify a predetermined operation that corresponds to the received action and the extracted at least one feature, and to identify, even for the same received action, a different predetermined operation for a different extracted at least one feature; and providing an instruction to the application through applying the identified predetermined operation to the user-interface.

2. The method according to claim 1, wherein the extracting extracts the at least one feature, by means of pattern recognition of the display.

3. The method according to claim 1, wherein the action is a physical motion of the user that is captured by a camera or a voice of the user collected by a microphone.

4. The method according to claim 1, wherein the application runs on another device that is different from the device provided with the screen.

5. A non-transitory computer-readable medium storing a program for causing the device provided with the screen to execute the method according to claim 1.

6. A device for controlling a user-interface that provides an instruction to an application through a user-operation which is performed on a display provided on the device, wherein the device comprising a memory having computer readable instructions; and at least one processor configured to execute the computer readable instructions, to acquire information displayed by the display;

extract at least one feature existing on the acquired information;

receive an action of a user;

search a database to identify a predetermined operation that corresponds to the received action and the extracted at least one feature, and to identify, even for the same received action, a different predetermined operation for a different extracted at least one feature; and provide an instruction to the application through applying the identified predetermined operation to the user-interface.

7. The method according to claim 1, wherein the predetermined operation to be identified is a first operation for a case where the extracted at least on feature is a first feature, and the predetermined operation to be identified is a second operation different from the first operation for a case where the extracted at least one feature is a second feature different from the first feature.

8. The device according to claim 6, wherein the predetermined operation to be identified is a first operation for a case where the extracted at least one feature is a first feature, and the predetermined operation to be identified is a second operation different from the first operation for a case where the extracted at least one feature is a second feature different from the first feature.

* * * * *